United States Patent [19]

de Cosnac et al.

[11] 4,075,658
[45] Feb. 21, 1978

[54] METHOD AND DEVICE FOR ISOLATING FIGURES IN AN IMAGE

[75] Inventors: Bertrand de Cosnac; Alain Spiwack, both of Paris, France

[73] Assignee: Commissariat a l'Energie Atomique, Paris, France

[21] Appl. No.: 681,300

[22] Filed: Apr. 29, 1976

[30] Foreign Application Priority Data

Apr. 29, 1975 France ................................. 75 13434

[51] Int. Cl.² ............................................. H04N 7/18
[52] U.S. Cl. ...................................... 358/96; 358/138
[58] Field of Search ...................... 358/93, 96, 83, 138

[56] References Cited

U.S. PATENT DOCUMENTS

| 2,933,008 | 4/1960 | Barnett | 358/96 |
| 3,354,266 | 11/1967 | Dinenno | 358/96 |
| 3,674,926 | 7/1972 | Dewey | 358/93 |
| 3,706,851 | 12/1972 | Froehlich | 358/96 |
| 3,729,584 | 4/1973 | de Vos | 358/280 |

Primary Examiner—Howard W. Britton
Attorney, Agent, or Firm—Sughrue, Rothwell, Mion, Zinn and Macpeak

[57] ABSTRACT

The graphic information contained in the image is converted by means of a television camera to a video signal constituted by a succession of lines, each line being sampled sequentially so as to obtain an ordered series of points which is stored in memory. The method consists in selecting a parent point forming part of an isolated figure of the image. All the points in which the level of blackening on the image exceeds an adjustable threshold value are isolated automatically by marking with an automaton coupled with the memory. All the marked points corresponding to the figure are extracted from the memory and the figure is reconstituted from the points.

10 Claims, 3 Drawing Figures

METHOD AND DEVICE FOR ISOLATING FIGURES IN AN IMAGE

This invention relates to an automatic method for isolating figures in an image as well as to a device for the practical application of the method in accordance with the invention.

As is generally known, it is often necessary for processing and analyzing information to isolate a certain number of figures in an image in order to be able to observe them separately and to calculate automatically the parameters which are related to each figure. Moreover, in order to achieve better visualization of said figure and to avoid any risk of oversight, it is important to ensure that isolation of the figures takes place automatically by erasing each figure of the image after processing in order to pass to the following figure.

The method and device in accordance with the invention are advantageously employed in the field of biomedical research for automatic sorting of chromosomes (karyotype) which are attached at the time of a metaphase. In this case the preparation observed under the microscope produces an image which consists of a set of dark grey shapes on a bright background. The problem is therefore as follows: to isolate one figure among others which form part of the same image in order to extract the parameters therefrom.

It is important to ensure that this isolation of figures takes place fairly rapidly and in a reliable manner. Moreover, the memory devices which are associated for the purpose of storing the electrical signals corresponding to the sampling of the image must have a relatively small capacity in order to reduce the cost of the equipment.

The present invention provides a method of solving the problem by satisfying the technical criteria which have been mentioned in the foregoing.

The method in accordance with the invention consists in memorizing the graphic information contained in an image, in sampling said image point by point, in coupling with the memory device an isolating automaton which distinguishes the points of the figures with respect to the background by virtue of the definition of a grey level threshold; said automation then isolates the component points of the figure by marking the words in memory.

In more precise terms, the method of isolation of figures in an image according to the invention consists in converting the visual information contained in the image to an electrical video signal obtained by means of a television camera, the video signal being constituted by a succession of lines separated by line-synchronizing pulses, then in sampling said video signal at uniform time intervals so as to obtain an ordered series of points having associated numerical values which are a function of the level of blackening of the points of the initial image, then in storing said ordered series of points in a memory device. The method according to the invention further consists in selecting a parent point which forms part of a figure $F_i$ to be isolated and all those points of said figure in which the level of blackening on the image exceeds a threshold of adjustable value are isolated automatically by marking with the aid of an isolating automaton coupled with said memory device, all the marked points corresponding to said figure are extracted from the memory device and said figure $F_i$ of the image is reconstituted from said points, whereupon the process of isolation is repeated for another figure, starting from another parent point.

In order to reduce the size of the memory device required for storage of information, a preferential alternative embodiment of the method according to the invention consists in compressing the information contained in the video signal before storing the ordered series of numerical values in memory. Said compression consists in recording in the memory device two signals having different formats according to the blackening level of the sampling is lower or higher than the adjustable threshold value. In the case of the background signals in which the blackening is lower than the threshold value, the format of the stored word format is a certain number of bits, the value in binary notation of the number of bits written in memory in respect of said points being equal to the length of that portion of the line which corresponds to the background.

The different marking of the points of the image $F_i$ will be described hereinafter.

The above-mentioned compression of information makes is possible to employ memories which have a much smaller capacity than those employed in the prior art.

After having completely isolated a figure $F_i$ of the image, that is, after having marked all the points corresponding to said figure, and after display and processing of the figure $F_i$ obtained by connecting all these points, said points are all marked by a certain number of bits which are written in memory in such a manner as to ensure that, at the time of isolation of the other figures of the image ($F_j$, $j \neq i$), the points of said figure $F_i$ are considered and processed as background points.

Further properties and advantages of the invention will become apparent from the following description of exemplified embodiments which are given by way of explanation and not in any limiting sense, reference being made to the accompanying drawings, wherein.

Figure 1:
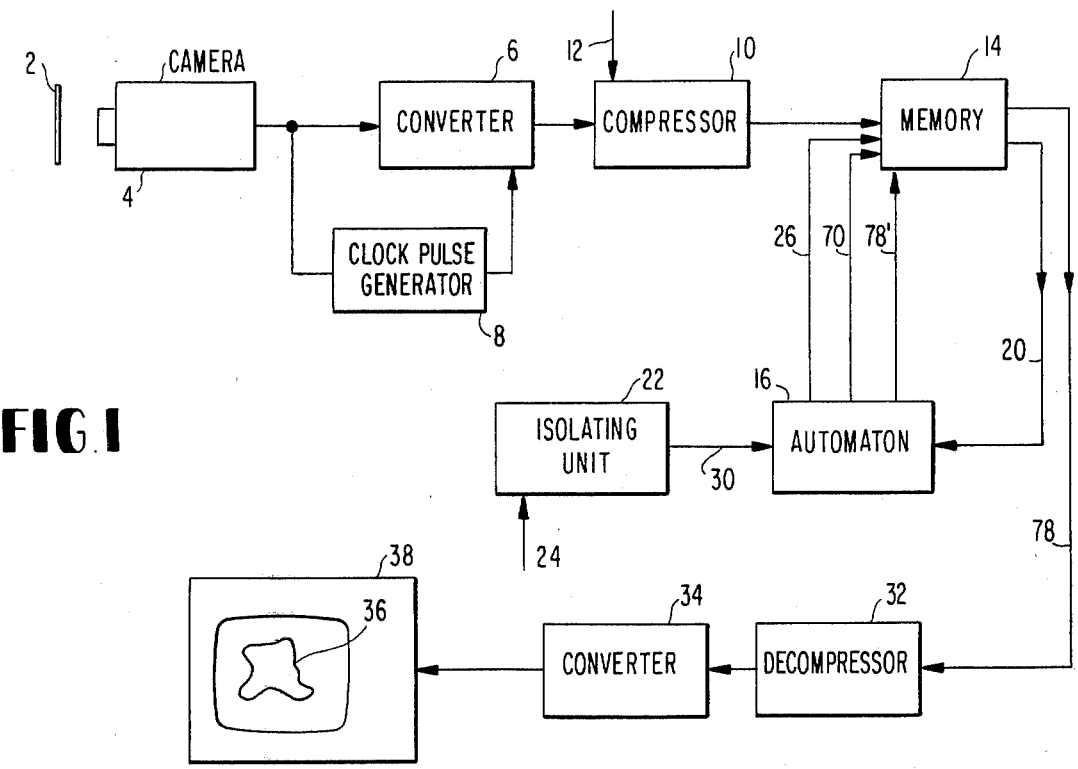
FIG. 1 is a block diagram showing the different elements of the device for carrying out the method according to the invention.

The device for isolating a figure contained in an image 2 comprises a television camera 4 in which the output signal is scanned by an analog-to-digital converter 6 associated with a clock-pulse generator 8. The output signal of the analog-to-digital converter 6 passes through an image compressor 10 of conventional type in which the associated threshold value is set either by hand or automatically by control means represented by the arrow 12. At the output of the compressor 10, the signals are fed into a memory device 14. The isolating automaton shown at 16 processes the output signals of the memory device and feeds them back to the input of the memory device after marking, via channel 70. The signals are transmitted from the memory device to the isolating automaton 16 via channel 20. The isolating unit or device for designating the parent point is shown at 22; the device 22 along the action channel 24 feeds signals into the memory device via automaton 16 and receives the output signals from said memory device via channel 28. The device 22 is connected to the isolating automaton 16 via channel 30. At the output of the memory device 14, the signals pass through channel 28 into an image decompressor 32, then into a digital-to-analog converter 34 so as to ensure that each figure such as 36 which forms part of the image 2 can be displayed visually on a television monitor 38.

Figure 2:
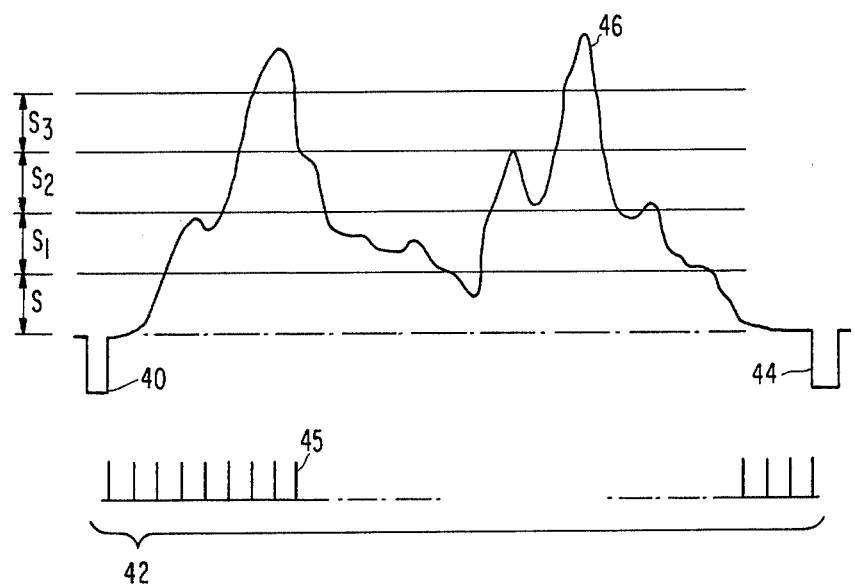
FIG. 2 is a schematic representation of a video line delivered by the television camera.

The video signal which is delivered by the camera 4 and consists of a plurality of lines such as the line shown in FIG. 2 passes from the camera 4 to the analog-to-digital converter 6. In the case of each line-synchronization signal such as 40, the clock-pulse generator 8 shown in FIG. 1 is reset to zero and said generator emits a series of pulses as shown at 42 between the two line-synchronizing pulses 40 and 44. The pulses serve to sample the video signal 46 emitted by the camera. In one example of construction, there are employed four hundred pulses produced by the clock-pulse generator 8 between two line-synchronizing pulses. The image 2 is scanned by a standard camera 4 having 625 interlaced lines. In order to simplify the design, it is possible to employ only one field of the video signal. Sampling of the image 2 accordingly consists of 400 points per line and 206 complete lines. The clock-pulse generator 8 therefore delivers 286 times 400 clock pulses 45.

In the analog-to-digital converter 6, the video signal is compared with a different series of thresholds S, $S_1$, $S_2$, $S_3$ as shown in FIG. 2. The first threshold S serves to differentiate the points of the background from the points which form part of an image. If it is assumed that a substantial part of the electrical signal corresponds to points of the background at the time of scanning of one line, a compressor 10 is employed in order to transmit only the length of the background line into the memory device 14 and to avoid the use of a plurality of points for all the background points which do not contain any information of interest.

The distinction between the background and the level points which form part of a figure entails the need for a threshold S which is introduced into the compressor 10 at 12.

In the case of dark figures against a white background, it will be stated that:
 a level point N forms part of a figure $F_i$ if $N \geq S$,
 conversely if $N < S$, the point is a point of the background.

In accordance with the invention, the points which form part of the background and the so-called level points, namely which correspond to $F_i$ are transmitted with two different formats. The level points or points forming part of a figure are transmitted with a format comprising N bits; a first bit is an initialization bit having a zero value when the point is a background point and having a value of 1 when the point is a level point; $a$ marking bits make is possible to mark in particular all the points which form part of one and the same figure and finally $b$ level bits determine the grey level of each point which forms part of one figure. In the exemplified embodiment described hereinafter, octets or 8-bit words are employed.

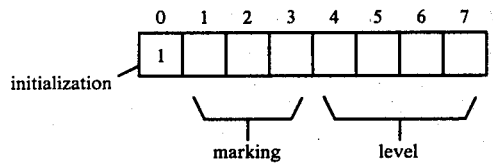

The points or $N < S$ (background points) are counted and the result of this counting operation is transmitted with the format;

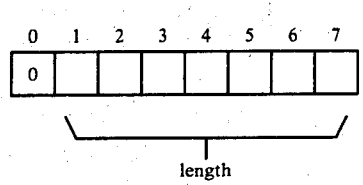

This type of counting of the points of the background associated with the format represented above permits a substantial saving of space within the memory 14 of the device.

In the case in which the length of word exceeds 128 points, the length will be transmitted several times.

In one embodiment of the invention, the line-synchronizing signal is transcribed by a particular word, namely the "separator", having the format:

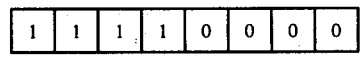

and in addition, the first and the last separator have the format:

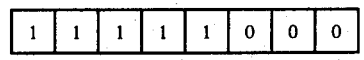

When this word appears, it is known that a line-synchronizing pulse has in fact been generated and this pulse serves to control the incrementation of the line counters by one unit.

In one embodiment of the invention, the memory device 14 is a memory having a capacity of 32K octets. The image decompressor 32 re-reads the memory device 14 by performing the operation which is reverse to compression. The decompressor supplies words having 4 bits, for example, to the digital-to-analog converter 34. The video signal is thus restituted on a television monitor 38. It is readily apparent that the background data have been lost in the series of operation but the points of the figures $F_i$ such as the point 36 are restituted in the normal manner.

Figure 3:
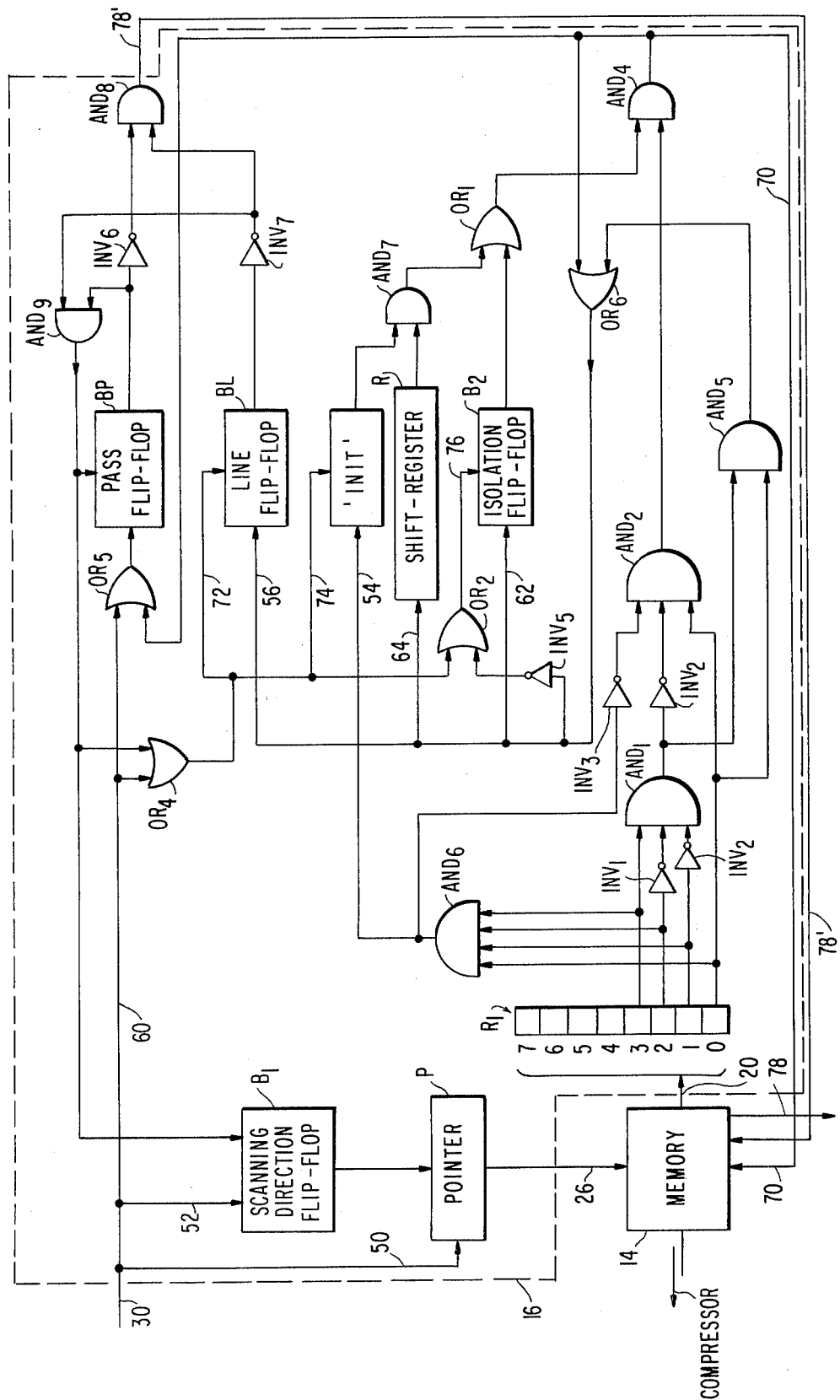
FIG. 3 is a block diagram showing the isolating automaton in accordance with the invention.

The isolating automaton, the operation of which will be described more specifically with reference to FIG. 3, is connected to the inputs and the outputs of the memory device 14.

The "marking" function is intended to mark or in other words to isolate the point from which the entire figure $F_i$ is isolated from point to point. The parent point which is isolated by the unit 22 is any point of the figure to be isolated. This marking operation is carried out on the $a$ bits of the format of a memory word corresponding to one point of the figure $F_i$. There are usually two modes of operation of the device according to the invention: an automatic mode in which the parent point of a figure is the first unerased level point encountered at the time of reading downwards and from left to right of the image, and a manual mode in which the parent point is the first unerased level point which is in coincidence with a device not shown in the figure and provided in order to enable the operator to designate said point (light pen, reticule on a television monitor and so forth).

FIG. 3 shows a block diagram of the isolating automaton which is essentially represented by the unit 16 of FIG. 1. The automaton essentially comprises a memory address pointer P and flipflops, namely a scanning direction flip-flop, a line flip-flop, an isolating flip-flop, a shift register and logical gates for marking the non-isolated level words and scanning the entire image in order to mark all the words which form part of one figure $F_i$ of said image by means of a contiguity test as will be explained hereinafter.

Each point of a memory line is characterized by its address contained in a memory address pointer (or line counter) P shown in FIG. 3. At the time of identification of the parent point and each time the scanning of one line has been completed without encountering any parent point, a register AMIN (not shown) is loaded with the address of the commencement of the following line contained in the memory address pointer. Thus, when a parent point has been encountered, the register AMIN will contain the address of the commencement of the line containing the parent point. The order of initialization of the isolating function derived from the manual device for designating the parent point via channel 26 sets the scanning direction flip-flop $B_1$ to the value 1 via channel 52.

It is recalled that the isolating function is intended to convert the memory words representing a figure whose initial state is:

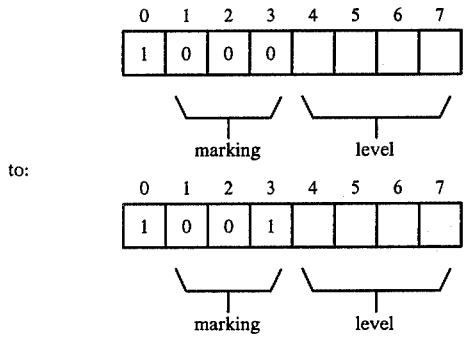

In this case, the bits 1, 2, 3 of the "level" words makes it possible to effect the isolation or in other words to differentiate the points which form part of a figure $F_i$ from the other points which form part of other figures $F_j$. In FIG. 3, the memory device 14 contains the different points of the image which is digitized in compressed form as obtained by means of the device shown in FIG. 1.

The memory address pointer P is a counter, the content of which is the address of the word read from memory. The scanning direction flip-flop $B_1$ indicates the direction of the pass: if the output value is 1, there is a downward pass and the memory address pointer P is incremented by 1 in order to read the following word. If the state of the flip-flop is 0, there is an upward pass and the pointer P is decremented by 1 in order to read the following word.

The isolating flip-flop $B_2$ is at 1 if the point preceding the point under examination is a point of the figure $F_i$ which is undergoing isolation but is otherwise at zero. The shift register R has within its register a number of points equal to the number of pulses delivered by the clock. This number is equal to the number of points per line (400 in the embodiment which is contemplated). The output of the shift register R is 1 if the point above and below forms part of $F_i$, as will be explained hereinafter, otherwise said output is zero.

The "INIT" flip-flop has the intended function of ensuring that, when the shift register is initialized, the output value of the shift register no longer has any importance since no point of the preceding line forms part a priori of figure $F_i$. In other words, the AND-gate 7 is connected to the output of the "INIT" flip-flop and is reset to zero at the beginning of each initialization order. In consequence, that which is written in the shift register is not counted in the case of the first line being studied since no point of the figure $F_i$ has been isolated in the case of this first line. The "INIT" flip-flop is set to one through channel 54, with the result that the shift register R can accordingly be caused to perform its real function.

The line flip-flop BL is set to 1 via channel 56 as soon as a point of the figure $F_i$ has been encountered at the time of a line scansion. When the output of the flip-flop BL is zero at the end of scanning of a line, it is necessary either to stop or to change the direction of scanning, these two functions being performed by the logical gates "INV" 7, "AND" 8, "AND" 9 at the output of the line flip-flop BL as will become apparent hereinafter.

The pass flip-flop BL is set to one as soon as a level has been isolated, that is to say one point of the figure $F_i$ in the pass. Said flip-flop therefore serves to determine at the end of the pass (with an output value of the line flip-flop which is zero) if points in the pass have been isolated.

The operation of the isolating sequence is as follows: The isolating unit 22 for designating the parent point transmits an initialization order to the pointer P via channel 50. Scanning is begun at the commencement of the line on which the parent point is located and the pointer is loaded to the value AMIN, which is the address of the line commencement at which the parent point is located. The scanning direction flip-flop $B_1$ is set to 1 via channel 52 and one usually begins with a downward pass, that is to say with video line numbers which increase by one unit. The pass flip-flop BP is set to 1 by the OR-gate 5 via channel 60. Thus at least two passes are always effected, namely an upward pass and a downward pass. The line flip-flop BL is reset to zero through the OR-gate 4; this line flip-flop BL must be at zero at the beginning of scansion of a new line. The INIT flip-flop is reset to zero through the logical OR-gate 4 in order to simulate a preceding zero line (output of the AND-gate 7 which remains at zero throughout the scansion of the first line). At the same time, the isolating flip-flop $B_2$ is reset to zero through the OR-gate 4 and the OR-gate 2. Said flip-flop must be at zero at the beginning of scansion of each line since there is no previous point of $F_i$ on the line, the current point of which is read from memory.

After initialization, the processing of the current point will now be described below: the word read from the memory device 14 is stored in a date register $R_1$ which holds one 8-bit word in this exemplified embodiment. Decoding of the content of said register is carried out as follows:

the output of the AND-gate 6 is at 1 if the bits 0, 1, 2 and 3 are equal to 1, 1, 1, 1, that is to say if a line separator is employed;

the output of the AND-gate 1 is at 1 if the bits 1, 2, 3 are equal to 0, 0, 1, the output of the AND-gate 2 is equal to 1 if the word which is read is a non-isolating level word, said output being fed into the AND-gate 4;

the output of the OR-gate 1 is at 1 if the point located above or below the current point forms part of the figure $F_i$ (output of AND-gate 7 = 1) or if the point located either to the left or to the right of the current point forms part of the figure $F_i$ (output of the isolating flip-flop $B_2$ equal to 1);

the output of the OR-gate 6 is at 1 if the point which is read forms part of the figure $F_i$ (isolated point if the output of the AND-gate 5 is equal to 1 or point to be isolated if the outputs of the AND-gate 4 is equal to 1);

the output of the AND-gate 4 is equal to 1 if the word which is read is a non-isolated level word and if the hypothesis of contiguity is verified.

The actions performed automatically after decoding are the following:

if the output of the AND-gate 4 is at 1, the read word must be isolated; if not, the following word is read;

if the output of the OR-gate 6 is at 1, the read point forms part of the figure $F_i$. The isolating flip-flop $B_2$ and the line flip-flop BL are therefore set to 1, this being carried out via channels 56 and 62. The value 1 in the case of an isolated level word is entered in the shift register via channel 64;

if the output of the OR-gate 6 is at 0, then 0 is entered in the isolating flip-flop via the INV-gate 5 and the OR-gate 2 and also in the shift register;

if a background word having a length $L_i$ is read, $L_i$ zeros are entered in the shift register;

the PASS flip-flop is set to 1 as soon as a point is isolated, that is, when the output of the AND-gate 4 is equal to 1 (by means of the OR-gate 5).

The continuous introduction of the values 0 or 1 into the shift register according as the level word belongs or does not belong to the figure $F_i$ makes it possible when passing from one line to the next to compare at the output whether the word is contiguous to a word located above or below according to the direction of the pass.

It is apparent that the combination of the isolating flip-flop $B_2$ and of the shift register R which are associated with the AND-gate 7 and the OR-gate 1 sends an isolating order into the memory device via channel 70 when and only when the point $P_a$ is contiguous with a point of the figure $F_i$ in respect of a given scanning direction, for example downwards and from left to right, that is to say if:

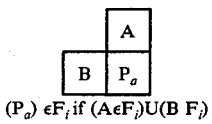

$(P_a) \epsilon F_i$ if $(A \epsilon F_i) U (B F_i)$

The same operation is performed in a similar manner when scanning is carried out upwards and from right to left.

When the output of the AND-gate 6 is equal to 1, that is, when a separating signal (signal 1111) has been detected from four bits 0, 1, 2, 3 of the word in the register $R_1$, the flip-flop INIT is set to 1 via channel 54, whereupon the state of the line and pass flip-flops is stated. If the output of BL is equal to zero and the output of BP is equal to 1, the direction of the pass must be changed. The pass flip-flop BP is then reset to 0, the line flip-flop BL is also reset to 0 by means of the OR-gate 4 and the channel 72, the flip-flop INIT is reset to 0 by means of channel 74 through the OR-gate 4 and the isolating flip-flop $B_2$ is also reset to 0 by means of the channel 76 and the OR-gate 2 and the OR-gate 4;

if BL = 0 and BP = 0, the isolation is completed and an end-of-isolation order is sent through the AND-gate 8 via channel 78' to indicate the end of isolation. This signal authorizes a rereading of memory 14 so that the information is sent through line 78 to be visualized.

A large number of parameters can be calculated from the isolated figure:

it is possible to calculate the area of the isolated figure $F_i$, for example a chromosome, by incrementing a counter each time one point of the figure $F_i$ is isolated; this counter is not shown in the figure but can be connected to the channel 70; said channel increments the counter each time a pulse passes through this latter. Said area counter is reset to zero by the new initialization of a parent point and the surface of the chromosome is obtained on said counter;

it is also possible to calculate the weighted area, that is, the sum of the grey levels of the component points $F_i$. Each time one point of $F_i$ is isolated, the grey level of the point is added to the content of an AIREPOND register (not shown); LMIN, LMAX are the numbers of the uppermost lines and the lowermost lines containing $F_i$; in order to obtain these latter at each transition from one line to the next and to locate the parent point by means of the device herein described for designating the parent point, an LMIN counter (not shown) is incremented by one unit. Thus, when the parent point of a figure $F_i$ is encountered, LMIN contains the number of the line of said parent point. A second counter LMAX (not shown) is loaded with the value of the counter LMIN at the beginning of each downward pass, LMAX is incremented by one unit at each end of line down to the lowermost line of the figure $F_i$.

The counter LMIN is loaded with the value LMAX at the beginning of each upward pass and LMIN is decremented by less than one unit at each end of line up to the uppermost line of the figure $F_i$. When the figure $F_i$ is completely isolated, the counters LMIN and LMAX contain the values which are sought.

It is also possible to record the address of commencement of the uppermost line and of the end of the lowermost line which contain $F_i$ within the counters AMIN and AMAX (not shown). At the end of scansion of a line, the counter AMIN is loaded with the content of the memory address pointer P at the time of an upward scan and the counter AMAX is loaded with the content of P at the time of a downward scan. When the isolation is completed, the counters AMIN and AMAX contain the values which are sought:

the values representing the abscissa of the point or points of the figure $F_i$ which are nearest the left-hand edge of the image and the abscissa of the point or points of the figure $F_i$ which are furthest from the left-hand edge of the image are obtained by means of the contents of two counters XMIN and XMAX (not shown). At the time of isolation of $F_i$, an abscissa pointer (not shown) determines at each instant the abscissa of the current point if said current point forms part of the figure $F_i$; its abscissa is compared with XMIN and XMAX:

if X < XMIN, X is stored in XMIN if X > XMAX, X is stored in XMAX if XMIN ≦ X ≦ XMAX, XMIN and XMAX remain unchanged.

At the end of the isolation, XMIN and XMAX have the values which are sought.

In order to transmit or transcribe the content of the memory corresponding to the figure $F_i$ on a writing device such as a printer, the memory is read from AMIN to AMAX and all the points having abscissae comprised between XMIN and XMAX are transmitted.

After reading of the memory from AMIN to AMAX, all the points which have been isolated and encountered and have the format

| 1 | 0 | 0 | 1 | level | are converted to

| 1 | 1 | 0 | 1 | level |

The level points in which the bits 1, 2, 3 = 1, 0, 1 are considered as background points (erased points). Processing of the following figure is then begun. The device for designating the parent point passes automatically to the address AMIN of the figure $F_i$ which has previously been scanned in order to find $F_i + 1$. It will naturally be necessary to pass again over the points of $F_i$ but without taking them into account since they have been erased by the previous marking operation. As soon as unerased level point is encountered, the new marking operation is performed and isolation of the figure $F_i + 1$ is carried out.

Processing of the image is completed when the marker encounters the last separator for the digitized image having the format:

| 1 | 1 | 1 | 1 | 1 | 0 | 0 | 0 |

It is readily apparent that the application of the method in accordance with the invention is not limited to the determination and isolation of chromosomes but extends to all types of figures contained in an image which is analyzed by a scanning camera.

What we claim is:

1. A method of isolation of figures in an image, in which the graphic information contained in the image is converted by means of a television camera to a video signal constituted by a succession of lines, each line being in turn constituted by an electrical analog signal having an amplitude which is variable in time, in which each line is then sampled sequentially at uniform time intervals so as to obtain an ordered series of points having associated numerical values which are a function of the level of blackening of the points of the initial image, and in which said ordered series of points is stored in a memory device, wherein said method consists in selecting a parent point forming part of an isolated figure of the image, wherein all those points of said figure in which the level of blackening on the image is higher than an adjustable threshold value are isolated automatically by marking with the aid of an isolating automaton coupled with said memory device, wherein all the marked points corresponding to said figure are extracted from the memory device and wherein said figure of the image is reconstituted from said points, whereupon the process of isolation is repeated for another figure, starting from another parent point.

2. A method according to claim 1 wherein, before storing the ordered series of points in memory, the informationcorresponding to those points of the image background in which the blackening level is below the adjustable threshold value is compressed by recording in the memory only a signal corresponding to the length of part of the line which is formed of adjacent background points or in other words the points corresponding to a blackening level of the image which is below said adjustable threshold value.

3. A method according to claim 1 wherein, after having completely isolated one figure of the image, the points recorded in memory and corresponding to said figure are marked by associating therewith one or a number of erasure bits of predetermined value which are contained within the format of said memory points in such a manner as to ensure that said points of the first figure are processed as background points at the time of isolation of the other figure of the image.

4. A method according to claim 1 wherein, in order to isolate the different points corresponding to one figure $F_i$ of the image starting from the initial choice of a parent point, the following operations are carried out in succession:

the address of the beginning of the video line corresponding to the initial parent point is recorded in a memory address pointer;

there are extracted sequentially from the memory device the different successive points derived from the sampling of the video lines starting from the video line corresponding to the parent point, there being associated with each memory point a word having a format of N bits, the value of a first bit being such as to correspond to an initialization according as the word corresponding to the point is a background or a figure point (having a value higher than the threshold value), in which $a$ bits are employed for isolation marking and B bits are employed for associating with each point a grey level which corresponds to the blackening of the image;

a logical gate is employed to determine by inspection of the first point initialization bit whether the point forms part of the background;

logical gates are employed to determine by inspection of the $a$ bits of the format whether the point extracted is marked as a point of the figures $F_i$ or in other words is an isolated "level" word;

when the inspection of the first initialization bit on the extracted point indicates that it is a background point, the following word of the video line is extracted from the memory device;

when the inspection of the first initialization bit on the extracted point indicates that the point is a "level" point, steps are taken to determine whether one of the two adjacent points or in other words the point previously examined or the point of the same order and recorded in memory in an adjacent line belong to the figure $F_i$ and when this is the case, the $a$ bits for isolating the word corresponding to said "level" point are marked so as to record in memory that said point is an isolated "level" point of the figure $F_i$;

the memory points corresponding to the different successive lines are extracted until a line which does not contain a "level" point is encountered, in which case the process is repeated in a pass having a direction opposite to the preceding, that is to say by changing the absolute value of incrementation of the video lines examined until a pass which does not contain a "level" point is encountered, in which case the "level" words corresponding to the isolated points of the figure $F_i$ are extracted from the memory.

5. A device comprising:
a video camera for viewing an image and delivering a video signal constituted by a succession of video lines,
a clock-pulse generator and an analog-to-digital converter supplied at the input with said video signal,
means for sampling the video signal at each pulse delivered by the clock-pulse generator;
means for comparing the amplitude of each sample of the video signal with at least one electrical threshold of adjustable value;
a memory which is fed by the output signal of said comparison means;
wherein said device further comprises:
means for selecting a parent point from a figure $F_i$ which forms part of the image;
an isolating automaton having the design function of marking on the words in memory corresponding to the different points of an isolated figure $F_i$ marking bits which are characteristic of their relationship to said image.

6. A device according to claim 5, wherein said device further comprises an image compressor placed between the analog-to-digital converter and said memory.

7. A device according to claim 5, wherein said device further comprises in serially disposed relation an image decompressor at the output of the memory, a digital-to-analog converter and a television screen for successively visualizing the isolated images of the figures $F_i$ contained in the image.

8. A device according to claim 5 wherein the isolating automaton comprises:
a scanning direction flip-flop connected to a memory address pointer which is in turn connected to said memory;
a data register for temporarily and successively storing each "level" word corresponding to a memory point, said word being such as to comprise N bits, one bit being such as to correspond to an initialization according as the point under study corresponds to a background point or to a figure point, $a$ bits being employed for the isolation marking and $b$ bits being employed for associating with each point a grey level corresponding to the blackening of the corresponding point of the image;
means consisting of logical gates connected to the $a$ bits of the word stored in the data register for determining whether the "level" word is an "isolated" level word or in other words forms part of the figure $F_i$;
means consisting of a shift register and an isolating flip-flop supplied by output signals of the logical gate means for determining the contiguity of the isolated level word with respect to the two other words of the figure $F_i$, the two contiguous words examined being the word previously examined and the word of the same order which corresponds to the video line previously examined;
means comprising a "LINE" flip-flop supplied by the output signals of said logical gates so as to deliver a signal of positive value at the output in respect of any line comprising an isolated point which forms part of the figure $F_i$, the output of said "LINE" flip-flop being connected to the scanning direction flip-flop;
a "PASS" flip-flop supplied by the output signals of said logical gates so as to deliver a signal of positive value at the output in the case of any pass in which a fresh point which forms part of the figure $F_i$ has been isolated, the output of said "PASS" flip-flop being connected to the scanning direction flip-flop;
an "INIT" flip-flop reset to zero by a commencement of scanning signal and set to 1 by an end of video line signal, the output of said flip-flop being connected to an AND-gate, the second input of which is connected to the output of the shift register.

9. A device according to claim 8, wherein said device further comprises an AND-gate, the inputs of said gate being connected to the output of the $a$ bits of the level word stored in the data register and the output of said gate being connected to one input of the "INIT" flip-flop.

10. A device according to claim 5, wherein said device further comprises means for calculating the area of each figure $F_i$ after isolation and the weighted area of each figure $F_i$.

* * * * *